United States Patent [19]

Engel

[11] 3,755,223
[45] Aug. 28, 1973

[54] EPOXY ABLATIVE COATING CONTAINING A SILICONE RESIN, A FIBROUS REINFORCING MATERIAL, AND A NON-ALKALI METAL PHOSPHATE AND BORATE SALT MIXTURE

[75] Inventor: Samuel L. Engel, Burbank, Calif.

[73] Assignee: The Dyna-Therm Corporation, Los Angeles, Calif.

[22] Filed: Dec. 5, 1969

[21] Appl. No.: 882,709

Related U.S. Application Data

[63] Continuation-in-part of Ser. No. 599,376, Dec. 6, 1966, abandoned.

[52] U.S. Cl............ 260/18 PN, 117/132 BE, 244/1, 260/2.5 EP, 260/2.5 FP, 260/18 EP, 260/37 EP, 260/824 EP
[51] Int. Cl............. C08g 47/10, B32b 27/38
[58] Field of Search............ 260/18 EP, 824 EP, 260/37 SI, 25 SI, 2.5 FP, 37 EP, 18 EP, 830 P, 2.5 EP; 117/132 BE; 244/1; 117/132 BS

[56] References Cited
UNITED STATES PATENTS

| | | | |
|---|---|---|---|
| 2,650,206 | 8/1953 | Stock | 260/2.5 |
| 2,912,394 | 11/1959 | Stilbert, Jr. et al. | 260/2.5 |
| 3,074,904 | 1/1963 | Higashi | 260/824 |
| 3,268,359 | 8/1966 | Boyd | 117/132 |
| 3,296,153 | 1/1967 | Snogren | 260/18 |
| 3,317,455 | 5/1967 | Blome et al. | 260/2.5 |
| 3,321,154 | 5/1967 | Downs | 244/1 |
| 3,380,941 | 4/1968 | Dittman et al. | 260/18 |
| 2,948,641 | 8/1960 | McCluer | 252/8.1 |
| 3,438,847 | 4/1969 | Chase | 252/8.1 |

OTHER PUBLICATIONS

"Long Orbital Life for Plastic Heat Shields" by Wesley L. Vaughan, Space Aeronautics July 1962 pages 83, 85, and 87.

Primary Examiner—Donald E. Czaja
Assistant Examiner—Eugene C. Rzucidlo
Attorney—Lyon & Lyon

[57] ABSTRACT

An ablative coating composition and a substrate coating with such composition are disclosed. The composition includes an epoxy resin, a curing agent, a silicone resin, fibrous reinforcing material and a salt mixture containing at least one non-alkali metal inorganic phosphate and borate.

24 Claims, No Drawings

EPOXY ABLATIVE COATING CONTAINING A SILICONE RESIN, A FIBROUS REINFORCING MATERIAL, AND A NON-ALKALI METAL PHOSPHATE AND BORATE SALT MIXTURE

This application is a continuation-in-part of my earlier filed, copending application, Ser. No. 599,376 filed Dec. 6, 1966, now abandoned.

High velocity vehicles designed to pass at high speed through the heavier layers of the atmosphere must contain a protective shield or coating of an ablative material to prevent over heating and/or destruction of the vehicle itself. Many such ablative materials have been developed and are currently in use on re-entry vehicles such as the Mercury, Gemini and Apollo space capsules. One of the most commonly used ablative materials is a molded nylon phenolic, which has good ablative properties in many applications. However, it is rather expensive to apply because it must be molded and then adhered to the body of the vehicle.

Recently, a more serious disadvantage of available ablative materials has developed as a result of the radio guided Nike-Zeus anti-missle missle. It has been found that the nylon phenolic ablative materials and other known ablative materials, upon ablating, release radio-disruptive ions which form an ion envelope around the vehicle as it is passing through the denser atmospheric layers. As indicated above, the Nike-zeus and various other missiles are radio guided. The presently available radio communication and the like are disrupted by this ion envelope so that radio communication is impossible. Accordingly, it is apparent that such ablative materials are not satisfactory for use on the Nike-Zeus and other missiles where guidance in the atmosphere is essential.

Thus, it is a principal object of the present invention to provide novel ablative coatings for atmosphere traversing high velocity vehicles which give minimal ion release during ablation.

More particularly, it is an object of the present invention to provide novel ablative coatings for use on the Nike-Zeus missile to avoid interference with the radar guidance system utilized therewith.

More specifically, it is an object of the present invention to provide an ablative material which is low in cost and gives off relatively few ions during ablation.

In another aspect it is an object of the present invention to provide a novel ablative coating which need not be molded prior to its application to the missile body or other substrate.

These and other objects and advantages of the present invention will become apparent from the more detailed description of the invention which follows.

Briefly, the present invention comprises an ablative coating composition and a substrate coated with the composition. The composition includes an epoxy resin, a curing agent for the epoxy resin, a polysiloxane resin, a reinforcing amount of high purity fibers, and a salt mixture containing at least one non-alkali metal inorganic phosphate and borate.

The ablative material is preferably applied to the substrate in the form of a volatile organic solvent solution. This may be accomplished by dip coating, spraying, etc. Preferred solvents are toluene and methyl ethyl ketone. However, the ablative material may be applied in essentially solvent free condition in the form of a mastic, in which case it is applied by trowel or doctor blade. The ablative material may also be applied to the substrate in the form of sheets. In this instance, the ablative material is formed and cured, and thereafter, the necessary shapes are cut from the cured sheet and applied to the substrate with an adhesive.

The substrates utilized in the present invention may be any of those commonly found in missiles and related products. Normally the substrate is metal or plastic such as 4340 steel, titanium, aluminum, and reinforced phenolic laminates.

The epoxy resin used in this invention preferably is a combination of an aromatic epoxy resin and an aliphatic epoxy resin, although the aromatic epoxy resin may be used alone. The aromatic epoxide resins are preferably the polygylcidyl ethers of aromatic diphenols. Such materials are commercially available, one example being that sold by Shell Chemical Company under the tradename "Epon". The aliphatic epoxy resins are normally polyglycoldiepoxides, preferably having an epoxide equivalent weight of about 305 to about 335. When such epoxide resins are used in admixture with the aromatic epoxides, they are normally used in an amount ranging from about 20 to about 30 percent by weight, based on the weight of the aromatic epoxy resin.

The curing agents for the above described epoxy resins may be any known commercially available such agents. Normally, the curing agent will be a polyamine or a polyamide. One example of such curing agents is the reaction product of an organic amine with a long chain aliphatic fatty acid, such as that available under the tradename "Versamid" from General Mills.

The silicone resins which may be employed in the present invention, as is well-known, are non-elastomeric resins and, when cured, are highly cross-linked, relatively rigid inflexible solids, with the molecular chains linked through oxygen atoms. Such resins, when used in the composition of this invention, may be cured, uncured or partially cured. One preferred such resin is a partially cured low molecular weight phenyl methyl polysiloxane laminating resin sold by Dow-Corning of Midland, Michigan, although other silicone resins, such as those commercially available from General Electric Company, may also be used. When uncured or partially cured silicone resins are used, curing is effected along with the epoxy resin at room temperature by the curing agent for the epoxy resin.

The fibrous reinforcing material which is used in the composition of this invention is a high purity fibrous material such as silica fibers or other such materials such as boron and carbon fibers. The purity of the fibrous material must be quite high, on the order of about 25 parts/million or less of alkali metal contamination. Such fibers, of course, are commercially available, with one suitable silica fibrous product being that sold by H. I. Thompson Company under the tradename "Refrasil".

As indicated previously, the salt mixture contains at least one non-alkali metal inorganic phosphate and borate. A wide variety of such phosphates and borates may be used. Preferred such salts include diammonium phosphate, ammonium biborate and the like. Since a coating composition with minimal alkali metal contamination is to be provided, the inorganic borate and phosphate utilized in the salt mixture should not contain a sufficient quantity of such contaminants to produce a composition containing more than about 25 parts/million alkali metal contamination. Preferably, the mixture is a 50–50 weight percent mixture of the phosphate and borate, although other proportions can be used. In general, the mixture should contain at least about 40 weight percent of the borate.

In general, during the ablation process, the cured epoxy resin undergoes charring and the silicone resin foams at about 300° F. to 400° F., due to the action of the heat upon the resin, and sublimes to give off gases. The salts also sublime and undergo gasification but at the lower temperature of about 140° F. to 160° F. and are believed to assist in providing the desired protective shield but do not form a radar disruptive cloud. The reinforcing fibers hold the charring epoxy resin and foaming silicone resin in place during the ablation process. I have also found that the application properties of the material on the substrate can be further improved by the addition thereto of a small amount, on the order of zero to four percent by weight of the composition, of a bodying agent such as finely powdered silica. One material which is commercially available for this purpose is a fumed silica sold under the tradename CAB-O-SIL.

It has been found that the foregoing cooperation of the various components in the ablative material is best obtained when the properties of materials are within the following ranges of percentage by weight, based on the total weight of the composition:

| Materials | Percentages |
|---|---|
| Epoxy resin plus curing agent | 50–75% by weight |
| Silicone resin | 1–10% by weight |
| Salts | 18–25% by weight |
| Reinforcing fibers | 2.5–15% by weight |

The epoxy resin is preferably from about 20 to about 40 weight percent of the total weight of the composition, and the quantity of curing agent will be the balance of the total weight of the epoxy resin and curing agent, about 10 to about 55 weight percent. By maintaining the proportions within these ranges it has been found that the ablative coating maintains good adhesion of the substrate over a temperature range from −140° F. to +125° F. and is capable of withstanding the the full impact of solar radiation of 360 BTU/FT$_2$HR./Day for at least five years.

Upon heating of the coated substrates of the present invention to ablation temperatures, it has been observed that the materials are very effective in absorbing heat. In addition, testing of these materials with ion radiation detection equipment reveals that the gases emitted during ablation do not interfere with normal radar and radio transmission. While not bound by any theory, it is believed that this is due to the very small alkali metal content present in the gases emitted by the coated substrates of the present invention. In general, the amount of alkali metal detected in the emitted gases is less than about 25 parts/million. This should be contrasted with the ablation materials containing asbestos and other available ablative materials wherein the alkali metal content detected has been on the order of about 4,000 parts/million. Thus, it can be seen that the coated substrates of the present invention are a significant improvement because of the reduced emission of interfering ions during ablation. It should also be noted that the application of the materials in solution form greatly simplifies the application of the coatings.

The invention will be better understood by reference to the following specific illustrative example. In the example, the parts and percentages are by weight unless otherwise indicated.

EXAMPLE

A 4340 steel rocket casing and nosecone were spray coated with a solution containing about 62 percent of a mixture of an aliphatic epoxy resin (a diglycidyl ether of propylene glycol) sold commercially under the tradename DER 732, Epon 828 aromatic epoxy resin [a glycidyl ether 2, 2- (4-hydroxyphenyl) propane] sold by Shell, and a Versamid curing agent (a low viscosity polyamide derived from the reaction of a dimerized ethylenically unsaturated fatty acid with an aliphatic polyamine), about ten percent by weight of the Dow-Corning silicone laminating resin described above, about five percent high purity silica fibers and about twenty-three percent of an equal weight mixture of di-ammonium phosphate and ammonium biborate. These materials were combined in a toluene solution, applied, and cured at room temperature, with evaporation of the solvent. Curing may, of course, be accelerated by heating to about 140° F., if desired. Upon heating the cured material to high temperature under simulated re-entry conditions, ablation occurred. It was observed that the epoxy resin charred but was held in place by the fibers. The silicone resin and salts were found to undergo sublimation and gasing. Analysis of the emitted gases during ablation revealed a very small alkali metal ion content on the order of about 10 parts/million. It was found that the operation of radar and radio equipment in proximity to the substrate undergoing ablation was not altered.

As is apparent from the foregoing, the composition and coated substrates of the present invention represent a significant advance in the ablative coating art. The coated substrates are simple and relatively inexpensive to manufacture. They are suitable not only on missiles, but on other structures where ablation properties are needed. During ablation, the substrates give off only very small amounts of radio disruptive ions, which is very important in radio guided missiles for the maintenance of continuous radio communication.

I claim:

1. A substrate having a coating of an ablative composition thereon in which said coating comprises at least approximately 20 weight percent of a cured epoxy resin selected from the group consisting of aromatic epoxy resins, and mixtures of aromatic and aliphatic epoxy resins, a non-elastomeric silicone resin, a reinforcing amount of high purity fibrous material having on the order of about 25 parts per million or less of alkali metal contamination, and from about 18 to about 25 per cent by weight of a non-alkali metal salt mixture containing at least one non-alkali metal inorganic phosphate and at least one non-alkali metal inorganic borate.

2. The coated substrate of claim 1 in which said salt mixture comprises diammonium phosphate and ammonium tetraborate.

3. The coated substrate of claim 1 in which said substrate is steel.

4. The coated substrate of claim 1 in which said substrate is plastic.

5. The coated substrate of claim 1 in which said ablative coating includes a small amount of powdered silica.

6. The coated substrate of claim 1 in which said silicone resin is a phenyl methyl polysiloxane.

7. The coated substrate of claim 1 in which said coating composition comprises approximately 20 to about 40 weight percent of epoxy resin, and about 2.5 to about 15 weight percent high purity silica fibers, about 1 to about 10 weight percent of said silicone resin and about 18 to about 25 percent by weight of said salt mixture based on the total weight of said composition.

8. The coated substrate of claim 7 in which said aromatic epoxy resin is a polyglycidyl ether of an aromatic diphenol.

9. A curable ablative coating composition comprising a mixture of at least approximately 20 weight percent of an epoxy resin selected from the group consisting of aromatic epoxy resins and mixtures of aromatic and aliphatic epoxy resins, a non-elastomeric silicone resin, a polyamine or polyamide curing agent for said epoxy and silicone resins present in an effective curing amount, a reinforcing amount of high purity fibers having on the order of about 25 parts per million or less of alkali metal contamination, and from about 18 to about 25 percent by weight, based on the total weight of said composition, of a non-alkali metal salt mixture containing at least one non-alkali metal inorganic phosphate and at least one non-alkali metal inorganic borate.

10. The composition of claim 9 in which said epoxy resin comprises about 20 to about 40 weight percent of said composition, said silicone resin about 1 to about 10 weight percent, and said fibers from about 2.5 to about 15 weight percent.

11. The composition of claim 10 in which said salt mixture contains at least approximately 40 weight percent, based on the total weight of said mixture, of said inorganic borate.

12. The composition of claim 10 in which said curing agent is a polyamide and the total weight of said epoxy resin and curing agent is about 50 to about 75 weight percent of the total weight of said composition.

13. The composition of claim 10 in which said epoxy resin is a mixture of about 20 to about 30 weight percent, based on the weight of the total quantity of said epoxy resin, of an aromatic epoxy resin and an aliphatic epoxy resin comprising a polyglycoldiepoxide.

14. The composition of claim 10 in which said salt mixture comprises diammonium phosphate and ammonium tetraborate.

15. The composition of claim 14 in which said salt mixture is a 50—50 weight percent mixture of said phosphate and said borate.

16. The composition of claim 9 in which said salt mixture contains diammonium phosphate and ammonium tetraborate, and at least approximately 40 weight percent of the total weight of said mixture is said tetraborate.

17. The composition of claim 10 in which said curing agent is the reaction product of an organic polyamine and a long chain aliphatic fatty acid.

18. The composition of claim 10 in which said silicone resin is a methyl phenyl polysiloxane.

19. A curable ablative coating composition comprising, based on the total weight of said composition, a mixture of approximately 20 to about 40 weight percent of epoxy resin consisting essentially of about 20 to about 30 weight percent of an aliphatic epoxy resin and about 70 to about 80 weight percent of an aromatic epoxy resin, about 10 to 55 weight percent of a polyamine or polyamide curing agent, about 1 to about 10 weight percent of a methyl phenyl polysiloxane silicone laminating resin, about 2.5 to about 15 percent by weight of high purity silica fibers having on the order of about 25 parts per million or less of alkali metal contamination, and from about 18 to about 25 percent by weight of a non-alkal metal salt mixture containing at least one non-alkali metal inorganic phosphate and at least one non-alkali metal inorganic borate.

20. The composition of claim 19 in which said salt mixture comprises diammonium phosphate and ammonium tetraborate.

21. The composition of claim 20 in which a maximum of about 4 percent by weight of fumed silica is included, based on the total weight of the said composition.

22. The composition of claim 19 in which said aromatic epoxy resin is a polyglycidyl ether of an aromatic diphenol and said aliphatic epoxy resin is a polyglycoldiepoxide.

23. The composition of claim 19 in which said salt mixture contains at least approxiamtely 40 weight percent of said inorganic borate, based on the total weight of said mixture.

24. The composition of claim 20 in which said salt mixture is a 50—50 weight percent mixture of said diammonium phosphate and ammonium tetraborate.

* * * * *